(12) United States Patent
Wilkinson

(10) Patent No.: US 6,430,316 B1
(45) Date of Patent: *Aug. 6, 2002

(54) MOTION VECTOR COMPENSATION USING OVERLAPPING WEIGHTED WINDOWS

(75) Inventor: James Hedley Wilkinson, Tadley (GB)

(73) Assignees: Sony Corporation, Tokyo (JP); Sony United Kingdom Limited, Weybridge (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/658,590

(22) Filed: Jun. 5, 1996

(30) Foreign Application Priority Data

Jun. 6, 1995 (GB) .............................. 9511427

(51) Int. Cl.[7] .............................. G06K 9/36; G06K 9/46
(52) U.S. Cl. .................................. 382/236; 375/240.16
(58) Field of Search ............................. 382/236, 232, 382/248, 250, 251, 260, 264, 268; 348/699, 402.1, 407.1, 413.1, 416.1, 431.1; 345/474

(56) References Cited

U.S. PATENT DOCUMENTS

| | | | | |
|---|---|---|---|---|
| 4,862,261 A | | 8/1989 | Tanaka ........................ 358/133 |
| 5,206,723 A | * | 4/1993 | Parke ......................... 348/416 |
| 5,400,087 A | * | 3/1995 | Uramoto et al. ............ 348/699 |
| 5,453,801 A | * | 9/1995 | Kim ............................ 348/699 |
| 5,512,962 A | * | 4/1996 | Homma ...................... 348/699 |
| 5,523,850 A | * | 6/1996 | Kanda et al. ............... 348/431 |
| 5,526,053 A | * | 6/1996 | Dorricott et al. .......... 348/699 |
| 5,535,288 A | * | 7/1996 | Chen et al. ................. 382/236 |
| 5,579,050 A | * | 11/1996 | Jung ........................... 348/699 |
| 5,602,593 A | * | 2/1997 | Katto .......................... 348/416 |
| 6,005,627 A | * | 12/1999 | Odaka et al. ............... 348/699 |

OTHER PUBLICATIONS

Watanabe et al., Windowed Motion Compensation, 1991, p 582–589, SPIE V 1605 Visual Communications and Image Processing '91: Visual Communication.*
Sullivan et al., Methods of reduced–complexity overlapped block motion compensation, Nov. 1994, pp. 957–961, IEEE ICIP–94, vol. 2.*
Katto et al., A wavelet codec with overlapped motion compensation for very low bit–rate environment, Jun. 1994, pp 328–338, IEEE Transactions on Circuits and Systems for Video Technology.*
Orchard et al., Overlapped block motion compensation: an estimation–theoretic approach, Sep. 1994, IEEE Transactions on Image Processing, vol. 3, Iss: 5, p. 693–9.*
Nogaki et al., An overlapped block motion compensation for high quality motion picture coding, May 1992, IEEE International Symposium on Circuits and Systems p. 184–7 vol. 1.*
Katto et al., An analytical framework for overlapped motion compensation, May 1995, p. 2189–2192, 1995 International Conference on Acoustics, Speech, and Signal Processing.*

* cited by examiner

Primary Examiner—Timothy M. Johnson
(74) Attorney, Agent, or Firm—Fromer Lawrence & Haug LLP; William S. Fromer; Joe H. Shallenburger

(57) ABSTRACT

A soft windowing technique involves the use of a window for vector assisted frame differing, the window being larger than a macroblock of the structure defined over the video picture. The edges of each window taper so that overlapping windows provide the correct pixel weighting at the edges. For a scheme having 16*16 luminance macroblocks and 8*8 chrominance macroblocks, the luminance window is 24*24 and the chrominance window is 12*12.

9 Claims, 2 Drawing Sheets

MOTION VECTOR COMPENSATION USING OVERLAPPING WEIGHTED WINDOWS

BACKGROUND OF THE INVENTION

1. Field of the Invention

This invention relates to video compression methods and apparatus, in particular in the context of motion vector compensation techniques.

2. Description of the Prior Art

One digital compression standard, known as MPEG, was devised by and named after the Motion Picture Experts Group of the International Standards Organisation (ISO). In one form, known as MPEG1, early versions of the draft standard made use of forward prediction between past and current frames of a video signal. In later forms of MPEG1 and another known as MPEG2, the standard additionally makes use of bidirectional prediction, namely a combination of forward and backward prediction with the prediction made as an average of the forward and backward predictive frames.

Further details of the MPEG standard are set out in ISO/IEC 11172-2:1993(E) "Information Technology—Coding of Moving Pictures and Associated Audio for Digital Storage Media at up to about 1.5 Mbit/s".

The use of motion compensation is an important aspect of MPEG coding. Motion compensation aims to minimize the error signal in difference frames by compensating for inter-frame movement. The process of motion compensation involves two separate processes:

i) Motion Vector Estimation (MVE); in which the motion offset between a frame pair is calculated; and
  ii) Motion Vector Compensation (MVC); which uses the results of the MVE calculations to produce a difference signal with minimum artifacts.

There are several aspect of MVE and MVC which must be considered such as:

i) The type of motion permitted. In MPEG and other similar systems, the type of motion is limited simply to translational vectors in the 'X' and 'Y' axes. Researchers working in other fields have used other motion types, such as rotation, skew and size. The benefits of this work are not clear since using more complex shape matching may reduce the signal in the difference picture, but requires more data to transmit the shape parameters.
  ii) The size of the macroblock is a compromise between smaller blocks having better coding efficiency but higher macroblock data rate, and larger blocks having worse coding efficiency but lower macroblock data rate (where a macroblock is the block size used for motion estimation and compensation).
  iii) How to combine the results from Luminance (Y) and Chrominance (C) block matching. If completely separate vectors are used for Y and C motion vectors, the macroblock data rate will be doubled and there may be the possibility of picture disturbances created by poor matching of Y and C vectors. Combining the Y and C vectors will result in a lower macroblock data rate but the coding efficiency may drop slightly.
  iv) The use of sub-pixel estimation and compensation. Often, motion between frames does not appear at integer pixel distances so some form of sub-pixel MVE and MVC will be beneficial. More vector data is generated to be transmitted/recorded and the data increase is very small but simple half-pixel estimation requires at least four times the computational power of a pixel based estimator and this must be considered.

There is a need for further developments in motion compensation coding with emphasis on low bit-rate systems in the range 64 Kbps to 2 Mbps.

SUMMARY OF THE INVENTION

It is an object of the invention to provide a video compression method involving motion vector compensation in which the problem of macroblock size compromise is alleviated.

It is another object of the invention to provide a video compression method involving motion vector compensation which is applicable to low bit-rate systems.

According to the invention there is provided a video compression method involving motion vector compensation, the method comprising:

defining a macroblock structure over a video picture to which motion vector analysis may be applied; and
  applying a soft window to the macroblock structure such that adjacent windows overlap, with the edges of each window forming progressively increasing pixel weightings from the edge inwards, the soft window being larger than each macroblock in the structure.

The pixel weightings are preferably selected so that each overlapped pixel arising from overlapping windows has a summed weighting equal to a constant.

The soft window is preferably 50% larger in each dimension than a macroblock of the structure, and the tapering part of each window edge preferably comprises one third of the total length. Where the macroblock sizes differ for chrominance and luminance, the window sizes may differ proportionately.

In a preferred embodiment of the invention, the window with soft edges provides motion compensation with much better results on many types of test material. Although errors at higher video data rates may not be so visible, applying the window still leads to a general reduction in picture distortions. The window is simple to apply and the window coefficients (or weightings) are easy to use.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
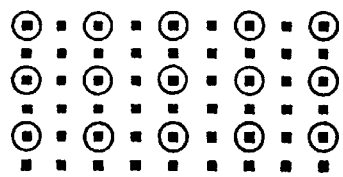
FIG. 1 shows a sample grid of luminance and chrominance components.

Three sizes of picture have been used with motion compensation;

i) 'VID' files: 720*576 pixels (and 704*576), with a target bit rate of around 4 Mbps.

ii) 'SIF' files: 352*288 pixels with a target bit rate of around 1 Mbps (video only) and iii) 'QIF' files: 176*144 pixels with a target bit rate of around 220 Kbps (video only).

In each case, the chrominance pixel size is half in each axis for each component.

Experiments have been conducted to find the optimum macroblock size for each of the above systems. In each case the position was clear in that a macroblock size of 16*16 pixels for luminance and 8*8 for each chrominance produced the best results. In all three cases above, smaller macroblocks such as 8*8 for Y and 4*4 for C resulted in too much vector data, and larger macroblocks such as 24*24 for Y and 12*12 for C resulted in low levels of macroblock data but high error signals in the difference pictures. In this respect MPEG has correctly set the optimum motion vector block size.

The vector data to be transmitted depends on the picture size, but the following calculations were used as a guide to the data rate required for vector transmission:

Case 1: 'VID' files, 720*576 pixels

Number of macroblocks=45*36=1620 per frame

Assuming the logarithmic temporal decimation structure and for Y data a vector range limit of +/−31 pixels/frame, for an 8-Frame GOP (group of pictures):

| No of Frames | Vector Range | Bits | +&− | H&V | Y&C | Total Bits |
|---|---|---|---|---|---|---|
| 4 | +/−31 | 6 | *2 | *2 | *2 | 192 |
| 2 | +/−63 | 7 | *2 | *2 | *2 | 112 |
| 1 | +/−127 | 8 | *2 | *2 | *2 | 64 |
| TOTAL BITS/GOP-MACROBLOCK: | | | | | | 368 |

The total vector bit rate is then 368*25/8*1620 = 1.863 Mbps

Assuming that entropy coding can lower this by about 50%, then the overall vector bit rate can be reduced to around 900 Kbps. As mentioned in the introduction, if the Y and C vectors are combined, then this data rate can be further reduced to around 500 Kbps. More about the method of combination will follow in the next section.

Case 2: 'SIF' files, 352*288 pixels

Number of macroblocks=22*18=396 per frame

Similar calculations to VID picture coding follow, bearing in mind that the vector range limit can be reduced to +/−15 pixels/frame:

| No of Frames | Vector Range | Bits | +&− | H&V | Y&C | Total Bits |
|---|---|---|---|---|---|---|
| 4 | +/−15 | 5 | *2 | *2 | *2 | 160 |
| 2 | +/−31 | 6 | *2 | *2 | *2 | 96 |
| 1 | +/−63 | 7 | *2 | *2 | *2 | 56 |
| TOTAL BITS/GOP-MACROBLOCK: | | | | | | 312 |

The total vector bit rate is then 312*25/8*396 = 386.1 Kbps

With entropy coding and Y/C vector combination, this can be reduced to around 100 Kbps.

Case 3: 'SIF' files, 176*144 pixels

Number of macroblocks=11*9=99 per frame

For 'QIF' coding, and using a vector range limit as for SIF pictures because motion errors are much more critical with such a low resolution source, then the total vector bit rate becomes;

$$312*25/8*99=96.5 \text{ KbDs}$$

which, with entropy reduction and Y/C vector combination, reduces to around 25 Kbps.

In each case above, the vector data rate is around 10% of the total required bit rate which is a reasonable allowance and not a level at which the motion vectors would severely limit the primary coding method. The use of macroblocks at a quarter of the size used above would increase the vector data rate to around 40% of the total data rate and become a severe overhead to the coding efficiency. The benefit gained by the use of quarter sized macroblocks is less than the quality loss resulting in the main coding area. Likewise, use of larger macroblocks reduces the vector data rate but only gains a small benefit for other coding areas. Such large macroblocks result in larger difference picture errors which cannot be so easily compensated in the remaining coding elements.

The use of sub-pixel vectors will require a small amount of extra data equivalent to an extra 14 bits per macroblock-GOP.

It has been mentioned that sending separate vectors for Y and C is wasteful of data bandwidth and could lead to misalignment of luminance and colour information. It is a commonly observed fact that the motion vectors of the chrominance components almost always follow the luminance component. There are exceptions, but these are very rare. Furthermore, the B-Y and R-Y components tend to have the same motion vectors. Therefore, a set of three vectors can easily be reduced to one by this simple assumption.

The problem with this assumption is a result of the nature of the chroma sub-sampling. Each chrominance component has half the sampling rate of the luminance component, leading to the sampling grid shown in FIG. 1.

Then, if a vector value has an odd luminance pixel value, there is a rounding problem in the chrominance vector value since the vector does not point directly to a chrominance pixel site. At first it may seem that simple rounding could be applied, and first experiments used this. However, it was found in subsequent tests that the choice of round-up or round-down resulted in a significant performance change for the chrominance coding. The rounding must be selected on a macroblock basis, and since there are two axes for the vectors, there are several rounding combinations as shown in FIG. 2.

Figure 2:
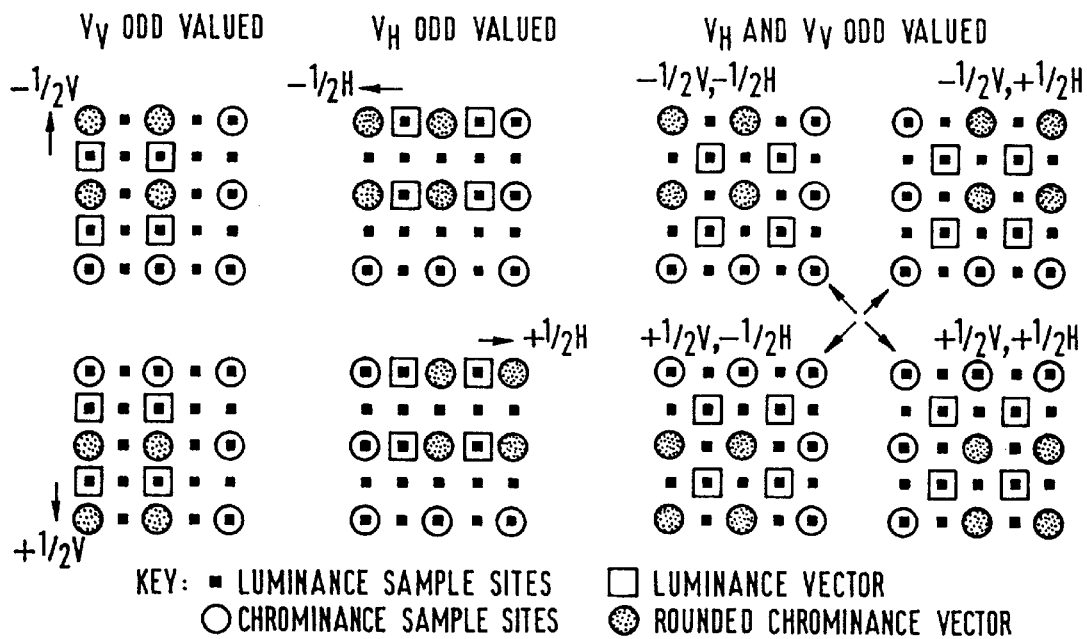
FIG. 2 shows a rounding process used for chrominance vector estimation.

In the first case, as shown in FIG. 2, where the horizontal vector is even valued and the vertical vector is odd valued, then the horizontal chrominance vector is simply half the luminance vector. However, the odd valued vertical vector can be rounded either up or down as indicated in the figure. Likewise for the second case where the vertical vector is even valued and the horizontal vector is odd valued. In this case, the horizontal rounding can be either up or down as indicated. In the last case, both horizontal and vertical vectors are odd valued resulting in four possible rounding options as shown.

The method of dynamically rounding on a macroblock basis could be avoided if the chrominance data were interpolated to the same size as the luminance data; however, this is expensive and uses extra memory. This alternative method works well and can be simply implemented by adding one extra bit to each luminance vector. If the bit is zero, then the rounding of the chrominance vector is 'down'; if the bit is one, then the rounding is 'up'. This small overhead will cover all the options shown in FIG. 2 and is a much lower overhead than that required to send independent chrominance vector data. Note that the technique is applied to both MVE and MVC processes.

sions were used for vector selection at various points in the project timescale:

$$MSE(a)=(Y_e)^2+(C_e)^2$$

$$MSE(b)=(Y_e)^2+2*(C_e)^2$$

Since there seems to be little benefit for either, the first case is to be recommended because of its simplicity.

In experiments conducted to assess the benefits of sub-pixel MVE and MVC, only ½ pixels have been considered. Using 'VID' files presents a problem in that the video is interlaced and the question arises as to the best method of vertical interpolation. Horizontal interpolation is not a problem.

Using 'SIF' and 'QIF' picture sources presents a simple linear interpolation process since both are effectively frame based progressively scanned at 25 frames per second. However, the filter order becomes an important issue as the pixel sizes reduce since the filter ringing artifacts become increasingly visible.

All interpolation filters have been based on half-band filters. Four types were used offering increasing tap lengths and sharper transition bands as follows:

```
1)                                   1   2   1
2)                        -1    0    9  16   9   0  -1
3)                3   0  -16    0   77       128  77   0  -16   0   3
4)  -6   0   26   0  -79    0   315       512  315   0  -79   0  26   0  -6
```

A further issue concerns the relationship between the scaling of Y and C values to generate the MSE (or MAD) values for MVE. Both Y and C are used since the vector will represent both components and where, for example, block matching of the luminance component may show little difference, the chrominance difference value may hold the balance of vector selection. In various experiments, the ratio did not seem to be critical and both the following expressions were used for vector selection at various points in the project timescale:

These filters will be referred to as respectively 1, 2, 3 and 4.

The first test results Used 'VID' pictures compressed using the 2-frame 'SX' system using alternate 'I' and 'B' frames. These results show the effects of applying first horizontal interpolation, only, then horizontal and vertical interpolation where the vertical interpolation was applied to a frame (rather than a field).

TABLE 1

Sub-Pixel Motion Compensation Using Different Methods

| Frame Number: | | 1 | 3 | 5 | 7 | 9 | 11 | 13 | 15 | 17 | 19 |
|---|---|---|---|---|---|---|---|---|---|---|---|
| No Interpolation | Y mse | 7.3841 | 6.9818 | 6.4252 | 7.7629 | 7.4938 | 7.0807 | 9.8862 | 8.0370 | 10.001 | 8.7079 |
| | C mse | 2.7787 | 2.5288 | 2.7253 | 2.6123 | 2.3503 | 2.2419 | 2.0432 | 1.8610 | 1.8340 | 1.9962 |
| | Y S/N | 36.69 | 36.65 | 36.72 | 36.64 | 36.64 | 36.66 | 36.56 | 36.48 | 36.55 | 36.51 |
| | C S/N | 37.31 | 37.24 | 37.32 | 37.35 | 37.27 | 37.29 | 37.18 | 37.06 | 37.07 | 37.02 |
| | Y bpp | 1.4937 | 1.4935 | 1.4622 | 1.5349 | 1.5334 | 1.4951 | 1.6676 | 1.5773 | 1.6626 | 1.5910 |
| | C bpp | 0.4685 | 0.4565 | 0.4641 | 0.4581 | 0.4465 | 0.4469 | 0.4358 | 0.4273 | 0.4278 | 0.4281 |
| | Σ bpp | 1.9622 | 1.9500 | 1.9263 | 1.9930 | 1.9799 | 1.9420 | 2.1034 | 2.0046 | 2.0904 | 2.0191 |
| Horizontal Interpolation Only | Y mse | 7.1965 | 6.6262 | 6.0303 | 7.525 | 7.2961 | 7.7389 | 6.3086 | 5.8330 | 5.4225 | 7.3818 |
| | C mse | 1.9811 | 1.9371 | 1.8813 | 1.9883 | 1.9111 | 1.8585 | 2.0060 | 1.7843 | 1.9985 | 1.9191 |
| | Y S/N | 36.67 | 36.65 | 36.73 | 36.63 | 36.63 | 36.60 | 36.67 | 36.78 | 36.80 | 36.67 |
| | C S/N | 37.41 | 37.32 | 37.41 | 37.43 | 37.34 | 37.34 | 37.18 | 37.06 | 37.06 | 37.03 |
| | Y bpp | 1.4981 | 1.4905 | 1.4527 | 1.5448 | 1.5417 | 1.5707 | 1.4453 | 1.3969 | 1.3810 | 1.4948 |
| | C bpp | 0.4102 | 0.4108 | 0.4077 | 0.4089 | 0.4075 | 0.4107 | 0.4268 | 0.4217 | 0.4333 | 0.4244 |
| | Σ bpp | 1.9083 | 1.9013 | 1.8604 | 1.9537 | 1.9492 | 1.9814 | 1.8721 | 1.8186 | 1.8143 | 1.9192 |
| Horizontal and Vertical | Y mse | 7.5413 | 7.2948 | 6.8039 | 8.0667 | 7.9487 | 8.2087 | 6.4070 | 6.0407 | 5.4421 | 7.7807 |
| | C mse | 1.8764 | 1.9113 | 1.9978 | 1.9651 | 1.8879 | 1.8651 | 2.0660 | 1.8445 | 2.0226 | 1.8970 |
| | Y S/N | 36.68 | 36.65 | 36.73 | 36.64 | 36.64 | 36.61 | 36.67 | 36.78 | 36.80 | 36.69 |

TABLE 1-continued

Sub-Pixel Motion Compensation Using Different Methods

| Frame Number: | | 1 | 3 | 5 | 7 | 9 | 11 | 13 | 15 | 17 | 19 |
|---|---|---|---|---|---|---|---|---|---|---|---|
| Interpolation | C S/N | 37.42 | 37.34 | 37.43 | 37.44 | 37.34 | 37.36 | 37.19 | 37.07 | 37.06 | 37.03 |
| | Y bpp | 1.5114 | 1.5133 | 1.4843 | 1.5674 | 1.5645 | 1.5930 | 1.4547 | 1.4070 | 1.3840 | 1.5059 |
| | C bpp | 0.4099 | 0.4089 | 0.4083 | 0.4094 | 0.4054 | 0.4087 | 0.4269 | 0.4213 | 0.4324 | 0.4230 |
| | Σ bpp | 1.9213 | 1.9222 | 1.8926 | 1.9768 | 1.9699 | 2.0017 | 1.8816 | 1.8283 | 1.8164 | 1.9289 |

The horizontal filter was set to type 3 and the vertical to type 1. The results are shown in Table 1 for a system with the following parameters:

Source Picture: Mobile & Calendar, frames 0–20
Compression type: I-B, 2-frame with 3-stage Wavelet Spatial Decimation
Quantisation: Q=1070, Quantiser Viewing Height=3H From this table, it can be clearly seen that the addition of horizontal sub-pixel motion compensation is worthwhile leading to significant drops in the overall bit rate (whilst S/N remains similar). However, the addition of vertical sub-pixel motion compensation adds nothing, indeed makes the performance worse. The benefits of vertical sub-pixel motion compensation are, therefore, difficult to justify for an interlaced scan picture source.

However, SIF and QIF pictures are frame based and do not have any problems with interlace. In experiments on both types of picture source, the application of sub-pixel motion compensation is equally valid in both the horizontal and vertical directions and as such the same filters are used for interpolation in both axes.

The second set of results were a rather more comprehensive comparison of pixel and sub-pixel motion compensation based on the use of SIF pictures coded at 0.4 bpp (~1 Mbps) based on an 8 frame GOP with Wavelet Spatial Decimation. Results are given in Table 2 below.

The results show a clear benefit of using sub-pixel vectors; rather clearer than the earlier example, and where the use of sub-pixel motion vectors produces a visible improvement in picture quality in viewing tests.

Tests of QIF coding always used sub-pixel motion vector compensation since all available methods were required to make any useful results available at the low bits-per-pixel targeted for this application. Hence no comparative measurements are available for QIF coding.

The investigations of the previous section revealed an anomaly in the philosophy of motion vector estimation as currently performed. It was not clear whether this would affect coding performance.

The anomaly only affects 'B' frames, not 'P' frames. Each 'B' frame has associated a pair of motion vectors, one pointing to the frame behind in time, the other pointing to a frame in advance. The selection of the vectors is made by comparing the macroblock of the current frame with a macroblock in another frame, but offset by an X-Y coordinate offset. This is usually calculated forwards and backwards by independent calculations. However, a 'B' frame is created by taking the average macroblock created from macroblocks in frames forwards and backwards of the 'B' frame; i.e.

$B_1 = I_1 - I_0/2 - I_2/2$. This is equivalent to a high pass filter: $-1, 2, -1$.

TABLE 2

Results of Pixel and Sub-pixel based Motion Vector Compensation for 1 Mbps SIF Pictures

| Vector Type: | | Integer Motion Vectors | | | | | Sub-Pixel Motion Vectors | | | | |
|---|---|---|---|---|---|---|---|---|---|---|---|
| Sequence | | Q | Y S/N | C S/N | Y bpp | C bpp | Σbpp | Q | Y S/N | C S/N | Y bpp | C bpp | Σbpp |
| Mobile | 0–8 | 185 | 27.57 | 29.69 | .3363 | .1065 | .3895 | 220 | 28.94 | 30.76 | .3356 | .1241 | .3976 |
| & | 8–16 | 185 | 27.61 | 29.69 | .3328 | .1073 | .3864 | 215 | 28.74 | 30.64 | .3285 | .1234 | .3902 |
| Calendar | 16–24 | 205 | 28.54 | 30.28 | .3305 | .1195 | .3902 | 230 | 29.32 | 31.12 | .3327 | .1254 | .3954 |
| Renata | 0–8 | 280 | 31.60 | 35.83 | .3655 | .0659 | .3984 | 300 | 32.04 | 36.10 | .3645 | .0700 | .3995 |
| | 8–16 | 270 | 31.24 | 35.53 | .3568 | .0643 | .3889 | 280 | 31.53 | 35.63 | .3510 | .0660 | .3840 |
| | 16–24 | 290 | 31.44 | 35.69 | .3637 | .0631 | .3952 | 310 | 31.89 | 36.01 | .3672 | .0706 | .4025 |
| Football | 0–8 | 450 | 37.28 | 39.49 | .3596 | .0677 | .3934 | 490 | 37.91 | 39.90 | .3614 | .0745 | .3986 |
| | 8–16 | 415 | 36.52 | 38.72 | .3629 | .0576 | .3917 | 470 | 37.37 | 39.35 | .3615 | .0652 | .3927 |
| | 16–24 | 320 | 33.88 | 36.63 | .3633 | .0578 | .3922 | 360 | 34.63 | 37.23 | .3601 | .0674 | .3938 |
| Susie | 0–8 | 1170 | 43.46 | 45.50 | .3509 | .0846 | .3932 | 1420 | 44.75 | 46.21 | .3497 | .1006 | .4000 |
| | 8–16 | 1160 | 43.48 | 45.48 | .3550 | .0839 | .3969 | 1410 | 44.60 | 46.25 | .3459 | .1016 | .3967 |
| | 16–24 | 1095 | 42.98 | 45.31 | .3475 | .0744 | .3847 | 1300 | 44.37 | 46.04 | .3546 | .0911 | .4001 |
| | 24–32 | 980 | 42.59 | 44.96 | .3578 | .0668 | .3912 | 1140 | 43.60 | 45.46 | .3541 | .0760 | .3921 |
| | 32–40 | 800 | 42.10 | 44.34 | .3559 | .0698 | .3908 | 810 | 42.32 | 44.32 | .3587 | .0672 | .3923 |
| | 40–48 | 890 | 43.67 | 44.99 | .3434 | .1028 | .3948 | 900 | 43.74 | 45.07 | .3416 | .1026 | .3929 |

Note 1: the calculation of the sum bit rate is Y+C/2 since the chrominance only has half the number of pixels compared to luminance.
Note 2: the interpolation filter was of type 4 (the most complex) for both horizontal and vertical axes.

The optimum macroblocks from frames $I_0$ and $I_2$ are normally calculated independently. This is equivalent to using a filter of type: 1, −1. The filters used for MVE are not the ones used for MVC. It is possible to envisage specific patterns which could cause a serious problem with the current method of MVE.

It is also easy to envisage a method of MVE which overcomes the problem by comparing the $I_1$ frame with all combinations of vector offsets each side. However, for a vector range of +/−V pixels, the independent vector calculation is proportional to:

$$2*(V^2)$$

whereas, with a bidirectional search, the calculation becomes proportional to:

$$(V^2)^2=V^4,$$

i.e. many times larger.

Where normal vector estimation is a severe computational problem, the prospect of bidirectional vector estimation for 'B' frame calculations is forbidding. No formal work has been done in this area. Indications given by the MSE values show that the normal method of MVE generation produces results which are close to the bidirectional value and it is suspected that for most pictures, there is no gain: However, designers should be aware of this problem should it ever become noticeable with certain motion sequences. If it becomes necessary to look into this area in more detail, it should be noted that there are ideas to minimise the processing impact—namely to use the independent results as a first estimate, then adopt a small search sub-area for each vector set to search for a minimum on the basis of a bi-directional search.

Note that the bi-directional search is only a function of encoding, and does not affect decoders; thus it is a retrofittable feature to an encoder.

Figure 3:
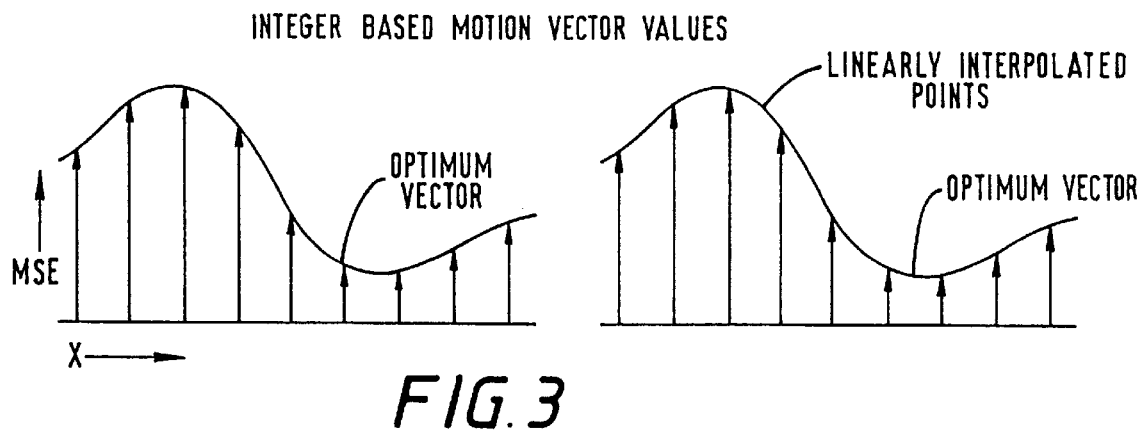
FIG. 3 shows the use of interpolation filters to create sub-pixel vectors.

Almost all the results of integer motion vector estimation show a relatively slow variation of values around the minimum vector. This raises the prospect of using a filter to determine sub-pixel vectors by applying interpolation filters to the vector correlation profile rather than the signal. The concept is simply illustrated in FIG. 3.

The interpolating filters should be of the half-band type defined earlier as filters 1–4. It is necessary for the interpolating filter to have negative valued coefficients otherwise interpolated vector values will never be minimum. Early work in this area proved the potential of this technique, but other areas of work meant that this technique was never established over the standard method of interpolating the picture data to generate sub-pixel motion vectors. This technique still needs further work to confirm if it produces vectors which are as reliable as the conventional method. The benefit is the considerable reduction in computation time taken to produce sub-pixel vector results.

A significant aspect of motion vector compensation is that of applying a soft window to the macroblock structure. During tests on the 1 Mbps 'SIF' coded pictures, it was noticed that in areas of rapid movement, the macroblock structure becomes visible. This is clearly evident when stepping through the sequence frame by frame. The macroblock became much more visible at the low rate of 256 Kbps using 'QIF' pictures where the macroblocks occupy an array size of 11 by 9 and are thus 16 times the area of a 'VID' coded picture.

At such a low bit rate, it became necessary to consider methods of improving the macroblock error visibility. As mentioned earlier, using smaller sized macroblocks is not possible because of the excessive bit rate taken by larger number of vectors. However, it is possible to significantly reduce the visibility of macroblock errors by using a windowing technique.

The basic size of the macroblock remains 16*16 for luminance (8*8 for each chrominance); however, a window of 24*24 (12*12 for chrominance) is used for the vector assisted frame differencing. In order for the overall estimation picture to have equal gain, the edges of the window are tapered as shown in FIG. 4 which shows window functions for Y and C macroblocks.

Figure 4:
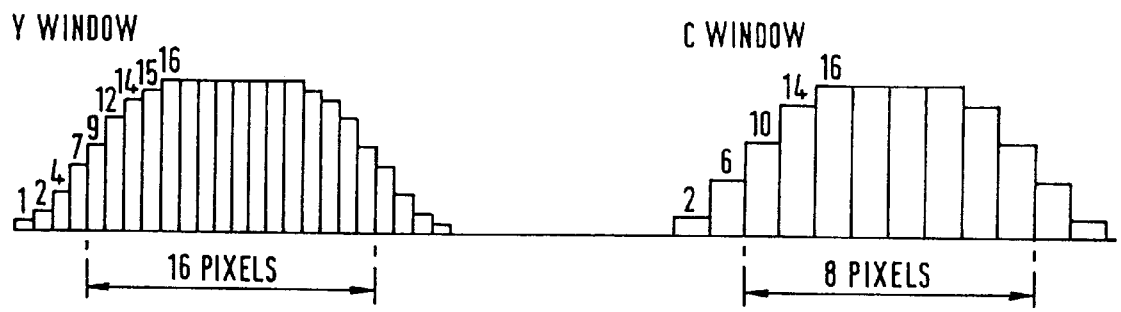
FIG. 4 shows window functions for luminance and chrominance macroblocks.
Figure 5:
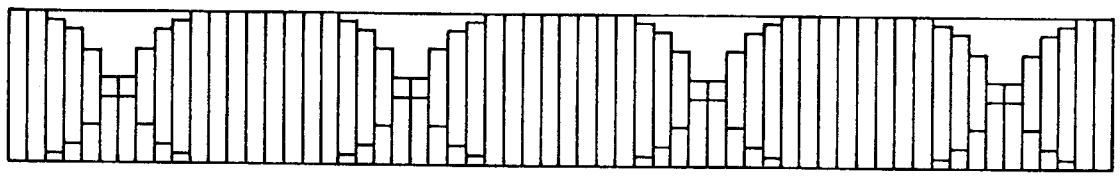
FIG. 5 shows overlay of the motion vector windows in one and two dimensions.

The windows shown in FIG. 4 form 'tiles' which can be overlaid on each other to form an overall flat surface as illustrated in FIG. 5. Using the 1-D template given in FIG. 4 and representing the window by the expression:

for(x=0; x<24; x++) window [x]=template[x];

then the 2-D window is given by the expression:

for(x=0; x<24; x ++)

for(y=0; y<24; y++)window[x][y]=template[x]*template[y];

Since the 1-D window is scaled by a value of 16, then the 2-D window is scaled by a factor of 256.

Tests were carried out to assess the effectiveness of windowed motion vectors used in both the motion estimation and motion compensation processes. These results are summarised in Tables 3 and 4 which show for different types of sequence, respectively:

(i) Using block based MVE and comparing block based MVC with window based MVC (ii) Using window based MVC and comparing block based MVE with window based MVE.

TABLE 3

| | | Comparing Block MVC against Windowed MVC | | | | | | | | | | |
|---|---|---|---|---|---|---|---|---|---|---|---|---|
| MV Type: | | Block MVE, block MVC | | | | | | Block MVE, window MVC | | | | |
| Sequence | | Q | Y S/N | C S/N | Y bpp | C bbp | Σbpp | Q | Y S/N | C S/N | Y bpp | C bbp | Σbpp |
| Mobile | 0–8 | 182 | 28.35 | 35.52 | .2646 | .1228 | .3260 | 184 | 28.42 | 32.56 | .2636 | .1242 | .3257 |
| & | 8–16 | 175 | 28.15 | 32.34 | .2683 | .1140 | .3253 | 177 | 28.23 | 32.40 | .2679 | .1150 | .3254 |
| Calendar | 16–24 | 182 | 28.48 | 32.72 | .2681 | .1185 | .3273 | 182 | 28.47 | 32.71 | .2656 | .1183 | .3247 |
| Renata | 0–8 | 294 | 32.88 | 39.61 | .3027 | .0447 | .3250 | 294 | 32.90 | 39.65 | .3020 | .0446 | .3243 |
| | 8–16 | 315 | 33.32 | 40.10 | .2984 | .0543 | .3255 | 315 | 33.23 | 40.11 | .2999 | .0543 | .3270 |
| | 16–24 | 345 | 34.00 | 40.44 | .2965 | .0561 | .3245 | 350 | 33.96 | 40.51 | .3006 | .0571 | .3291 |

TABLE 3-continued

Comparing Block MVC against Windowed MVC

| MV Type: | | Block MVE, block MVC | | | | | | Block MVE, window MVC | | | | |
|---|---|---|---|---|---|---|---|---|---|---|---|---|
| Sequence | | Q | Y S/N | C S/N | Y bpp | C bbp | Σbpp | Q | Y S/N | C S/N | Y bpp | C bbp | Σbpp |
| Football | 0–8 | 285 | 34.14 | 38.60 | .3052 | .0296 | .3200 | 305 | 34.69 | 38.90 | .3112 | .0319 | .3271 |
| | 8–16 | 285 | 33.39 | 38.55 | .3078 | .0251 | .3203 | 300 | 33.81 | 38.78 | .3126 | .0263 | .3257 |
| | 16–24 | 235 | 31.38 | 37.33 | .3124 | .0261 | .3254 | 242 | 31.68 | 37.45 | .3119 | .0271 | .3254 |
| Susie | 0–8 | 940 | 42.63 | 47.59 | .2952 | .0643 | .3273 | 920 | 42.35 | 47.36 | .2954 | .0617 | .3262 |
| | 8–16 | 930 | 42.72 | 47.54 | .2956 | .0622 | .3267 | 915 | 42.50 | 47.44 | .2961 | .0615 | .3268 |
| | 16–24 | 860 | 41.98 | 47.02 | .2987 | .0548 | .3261 | 860 | 41.83 | 47.02 | .2996 | .0548 | .3266 |
| | 24–32 | 730 | 40.68 | 46.39 | .3037 | .0478 | .3276 | 735 | 40.63 | 46.53 | .3024 | .0483 | .3265 |
| | 32–40 | 470 | 38.55 | 43.27 | .3130 | .0288 | .3274 | 494 | 39.02 | 43.68 | .3084 | .0306 | .3237 |
| | 40–48 | 470 | 39.44 | 42.36 | .3170 | .0251 | .3232 | 540 | 40.76 | 43.03 | .3109 | .0291 | .3254 |

TABLE 4

Comparing Block Matched MVE and Window Matched MVE

| MV Type: | | Block MVE, block MVC | | | | | | Block MVE, window MVC | | | | |
|---|---|---|---|---|---|---|---|---|---|---|---|---|
| Sequence | | Q | Y S/N | C S/N | Y bpp | C bbp | Σbpp | Q | Y S/N | C S/N | Y bpp | C bbp | Σbpp |
| Mobile | 0–8 | 184 | 28.42 | 32.56 | .2636 | .1242 | .3257 | 184 | 28.41 | 32.56 | .2646 | .1244 | .3268 |
| & | 8–16 | 177 | 28.23 | 32.40 | .2679 | .1150 | .3254 | 176 | 28.17 | 32.36 | .2667 | .1146 | .3240 |
| Calendar | 16–24 | 182 | 28.47 | 32.71 | .2656 | .1183 | .3247 | 182 | 28.48 | 32.71 | .2655 | .1184 | .3247 |
| Renata | 0–8 | 294 | 32.90 | 39.65 | .3020 | .0446 | .3243 | 301 | 33.02 | 39.89 | .3041 | 0.461 | .3271 |
| | 8–16 | 315 | 33.23 | 40.11 | .2999 | .0543 | .3270 | 315 | 33.27 | 40.12 | .2962 | .0544 | .3234 |
| | 16–24 | 350 | 33.96 | 40.51 | .3006 | .0571 | .3291 | 350 | 34.00 | 40.50 | .2988 | .0571 | .3273 |
| Football | 0–8 | 305 | 34.69 | 38.90 | .3112 | .0319 | .3271 | 308 | 34.74 | 39.19 | .3108 | .0324 | .3270 |
| | 8–16 | 300 | 33.81 | 38.78 | .3126 | .0263 | .3257 | 300 | 33.86 | 38.91 | .3106 | .0262 | .3237 |
| | 16–24 | 242 | 31.68 | 37.45 | .3119 | .0271 | .3254 | 242 | 31.64 | 37.49 | .3101 | .0271 | .3236 |
| Susie | 0–8 | 920 | 42.35 | 47.36 | .2954 | .0617 | .3262 | 920 | 42.36 | 47.35 | .2980 | .0617 | .3296 |
| | 8–16 | 915 | 42.50 | 47.44 | .2961 | .0615 | .3268 | 930 | 42.57 | 47.53 | .2987 | .0622 | .3298 |
| | 16–24 | 860 | 41.83 | 47.02 | .2996 | .0548 | .3266 | 860 | 41.83 | 47.01 | .2977 | .0548 | .3251 |
| | 24–32 | 735 | 40.63 | 46.53 | .3024 | .0483 | .3265 | 738 | 40.65 | 46.53 | .3009 | .0485 | .3251 |
| | 32–40 | 494 | 39.02 | 43.68 | .3084 | .0306 | .3237 | 494 | 39.04 | 43.69 | .3087 | .0306 | .3240 |
| | 40–48 | 540 | 40.76 | 43.03 | .3109 | .0291 | .3254 | 540 | 40.78 | 43.25 | .3081 | .0293 | .3227 |

The cost of implementing windowed MVC is relatively small and is a practical option, particularly in view of the considerable quality improvement obtained over block based MVC. This improvement is numerically most noticeable in the last two rows of the Susie results in Table 3. Other rows show little change or even slightly worse results. The visual effect of windowed MVC is, however, always better than block based MVC.

Turning to the results of Table 4; the results of the comparison show small differences in some sequences, but the implementation of windowed MVE is very expensive since it involves computations over a much wider area. This is reflected in the software run-time which was noticeably slower than block based MVE. This factor, together with the results of Table 5 clearly show that the effort of using both windowed MVE and windowed MVC is not worthwhile. There is also little visual improvement also. However, using block based MVE and window based MVC is very beneficial and change a previously unacceptable picture quality (the Susie sequence in particular) to a much more acceptable quality level.

The combination of block-based MVE and window based MVC was also applied to the SIF coded pictures at 1 Mbps with a similar quality improvement. It has yet to be established that the improvement is worthwhile at higher data rates (e.g. for 'VID' pictures at 4 Mbps), however, it is likely that the benefit will still exist, but at lower levels.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A motion vector compensation method comprising the steps of:
    defining a macroblock structure of macroblocks where the macroblock size differs for chrominance and luminance blocks over a video picture to which motion vector analysis may be applied to obtain therefrom motion vectors of said macroblocks;
    applying a soft window structure having a window size where the window sizes for chrominance and luminance differ proportionately to the block size difference to said macroblock structure such that soft windows overlay said blocks with the edges of each soft window forming progressively increasing pixel weightings from the edge inwards, the soft window being larger than each block in the macroblock structure such that adjacent soft windows overlap and the pixel weightings are selected so that each overlapped pixel arising from overlapping soft windows has a summed weight equal to a constant; and motion vector compensating using said soft windows to obtain said motion vectors obtained from said motion vector analysis of said blocks, whereby the soft window is 50% larger in each dimension than each dimension of a block of the structure.

2. A method according to claim 1, wherein there are respective different block sizes and window sizes for luminance and chrominance motion vector analysis.

3. A method according to claim 2, wherein said edges of each soft window taper according to said progressively increasing pixel weightings such that adjacent soft windows mesh.

4. A method according to claim 3, wherein said progressively increasing pixel weightings of a respective soft window do not taper the underlying block.

5. A method according to claim 1, wherein said step of applying a soft window structure applies soft windows only when motion vector compensating said blocks on the basis of sub-pixels.

6. A motion vector compensation method comprising the steps of:

defining a macroblock structure of macroblocks where the macroblock size differs for chrominance and luminance blocks over a video picture to which motion vector analysis may be applied to obtain therefrom motion vectors of said macroblocks;

applying a soft window structure having a window size where the window sizes for chrominance and luminance differ proportionately to the block size difference to said macroblock structure such that soft windows overlay said blocks with the edges of each soft window forming progressively increasing pixel weightings from the edge inwards, the soft window being larger than each block in the macroblock structure such that adjacent soft windows overlap and the soft window is 50% larger in each dimension than each dimension of a block of the structure; and motion vector compensating using said soft windows to obtain said motion vectors obtained from said motion vector analysis of said blocks.

7. A method according to claim 6, wherein each soft window edge comprises one third of a total length of each soft window.

8. A method according to claim 6, wherein there are respective different block sizes and window sizes for luminance and chrominanco motion vector analysis.

9. A method according to claim 8, wherein the luminance block and soft window sizes are respectively 16*16 and 24*24 pixels per block, and the chrominance block and soft window sizes are respectively 8*8 and 12*12 pixels per block.

* * * * *